US008351296B2

(12) United States Patent
Hu et al.

(10) Patent No.: US 8,351,296 B2
(45) Date of Patent: Jan. 8, 2013

(54) ULTRASONIC LAMP AND CONTROL METHOD THEREOF

(75) Inventors: Chao-Wen Hu, Hsinchu (TW); Yi-Chung Lee, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 388 days.

(21) Appl. No.: 12/834,545

(22) Filed: Jul. 12, 2010

(65) Prior Publication Data

US 2011/0133653 A1 Jun. 9, 2011

(30) Foreign Application Priority Data

Dec. 9, 2009 (CN) .......................... 2009 1 0259009

(51) Int. Cl.
*H05B 37/02* (2006.01)
*G01S 15/88* (2006.01)

(52) U.S. Cl. .......................................... 367/96; 315/149

(58) Field of Classification Search .................... 367/96; 315/149
See application file for complete search history.

*Primary Examiner* — Daniel Pihulic

(74) *Attorney, Agent, or Firm* — Rabin & Berdo, P.C.

(57) ABSTRACT

An ultrasonic lamp control method is provided. The control method includes the following steps. The ultrasonic lamp emits a first burst, and detects whether a first echo is received within a fixed period of time after the emission of the first burst. If the first echo is received within the fixed period of time, then the ultrasonic lamp neglects the first echo and emits a second burst. The ultrasonic lamp detects whether a second echo is received within the fixed period of time after the emission of the second burst. If the second echo is received within the fixed period of time, then the ultrasonic lamp enters a control mode.

8 Claims, 3 Drawing Sheets

ULTRASONIC LAMP AND CONTROL METHOD THEREOF

This application claims the benefit of People's Republic of China application Serial No. 200910259009.3, filed Dec. 9, 2009, the subject matter of which is incorporated herein by reference.

BACKGROUND OF THE INVENTION

1. Field of the Invention

The invention relates in general to an ultrasonic lamp and a control method thereof, and more particularly to an ultrasonic lamp capable of preventing incorrect movement and a control method thereof.

2. Description of the Related Art

Having the feature of high frequency, the ultrasound has been widely used in many fields such as military, medicine and industries. However, with the advance in technology, the ultrasonic lamp has become one of the applications of the ultrasound technology. By continuously emitting a burst which hits a reflective object, the ultrasonic lamp can detect the time of flight of an echo, and then performs various controls according to the time length. However, if there are two or more than two ultrasonic lamps existing in the same space, errors might occur to the ultrasonic lamp due to the mutual interference of the echoes of the bursts emitted at similar frequencies.

Referring to FIG. 1, a timing diagram of the echo interference of two ultrasonic lamps L1 and L2 is shown. In FIG. 1, designations 110, 112 and 114 denote the bursts emitted by the ultrasonic lamp L1, and designations 120, 122 and 124 denote corresponding echoes of said bursts. Further, designations 130, 132 and 134 denote the bursts emitted by another ultrasonic lamp L2, and designations 140, 142 and 144 denote the corresponding echoes of said bursts. In general, the ultrasonic lamp determines the location of an object according to the first received echo reflected back from the object. Since the ultrasonic lamps L1 and L2 are located in the same space and the ultrasonic lamps L1 and L2 emit the bursts at different time points, the ultrasonic lamp L1 may receive the echo of the burst emitted by the ultrasonic lamp L2. For example, within a fixed period of time Δt after emitting the burst 110, the ultrasonic lamp L1 may receive the echo 140 of the burst 130 emitted by the lamp L2. Since the first received echo 140 is not the echo 120 that the lamp L1 is supposed to receive, the ultrasonic lamp L1 will make an erroneous determination to enter the control mode, hence incurring errors.

SUMMARY OF THE INVENTION

The invention is directed to an ultrasonic lamp and a control method thereof. According to the time difference of the same frequency, incorrect echoes are staggered, and errors are avoided.

According to a first aspect of the present invention, an ultrasonic lamp control method is provided. The control method includes the following steps. The ultrasonic lamp emits a first burst, and detects whether a first echo is received within a fixed period of time after the emission of the first burst. If the first echo is received, then the ultrasonic lamp neglects the first echo and emits a second burst. The ultrasonic lamp detects whether a second echo is received within the fixed period of time after the emission of the second burst. If the second echo is received, then the ultrasonic lamp enters a control mode.

According to a second aspect of the present invention, an ultrasonic lamp including a microprocessor, an ultrasonic transmitter and an ultrasonic receiver is provided. The ultrasonic transmitter and the ultrasonic receiver respectively are coupled to the microprocessor. The microprocessor drives the ultrasonic transmitter to emit a first burst, and detects whether a first echo is received by the ultrasonic receiver within a fixed period of time after the emission of the first burst. If the first echo is received by the ultrasonic receiver, then the microprocessor neglects the first echo and drives the ultrasonic transmitter to emit a second burst, and further detects whether a second echo is received by the ultrasonic receiver within the fixed period of time after the emission of the second burst. If the second echo is received by the ultrasonic receiver, then the microprocessor enables the ultrasonic lamp to enter a control mode.

The above and other aspects of the invention will become better understood with regard to the following detailed description of the preferred but non-limiting embodiment. The following description is made with reference to the accompanying drawings.

DETAILED DESCRIPTION OF THE INVENTION

The invention provides an ultrasonic lamp and a control method thereof. According to the time difference of the same frequency, incorrect echoes are staggered and correct echoes are received first, hence avoiding the occurrences of errors.

Figure 2:
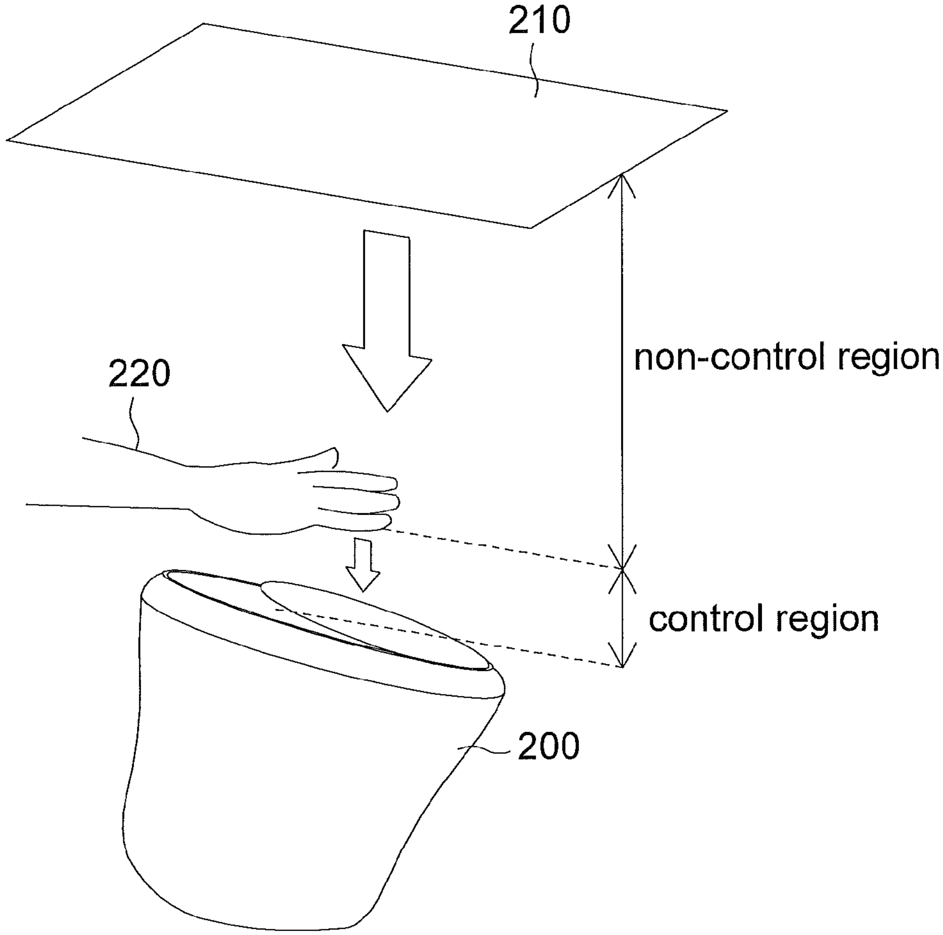
FIG. 2 shows an ultrasonic lamp according to a preferred embodiment of the invention.

Referring to FIG. 2, an ultrasonic lamp according to a preferred embodiment of the invention is shown. The ultrasonic lamp 200 continuously emits a burst, and determines whether to perform various controls, such as the brightness, the color and the range of radiation, according to the time length of receiving the echo which is generated when the burst hits a reflective object. If the reflective object 210 is inside the non-control region, such as the ceiling, the echo of the burst takes a longer time to be received. On the contrary, if the reflective object 220 (such as the hand) is inside the control region, that is, near the ultrasonic lamp 200, then the echo of the burst takes a shorter time to be received such as within a predetermined fixed period of time Δt. The ultrasonic lamp 200 will enter a control mode in which the user control the properties of the light if it is determined that the echo is received within the fixed period of time Δt.

Figure 3:
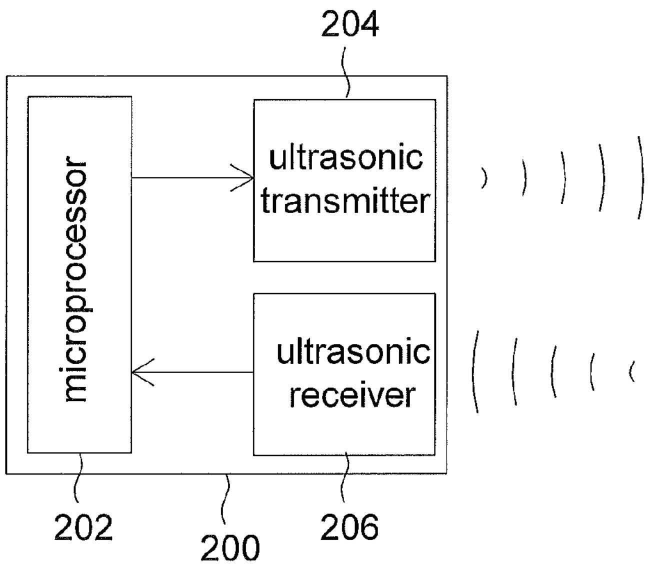
FIG. 3 shows a functional block diagram of the ultrasonic lamp according to a preferred embodiment of the invention.

Referring to FIG. 3, a functional block diagram of an ultrasonic lamp according to a preferred embodiment of the invention is shown. The ultrasonic lamp 200 includes a microprocessor 202, an ultrasonic transmitter 204 and an ultrasonic receiver 206. The ultrasonic transmitter 204 is coupled to the microprocessor 202 for receiving a driving signal from the microprocessor 202 to emit a burst. The ultrasonic receiver 206 is coupled to the microprocessor 202 for receiving an echo of the burst and feeding back the echo to the microprocessor 202. The microprocessor 202 determines the distance between the object and the lamp 200 according to the time of flight of the echo, and the lamp 200 will enter a control mode if the object is inside the control region (the echo is received within the fixed period of time Δt).

Figure 4:
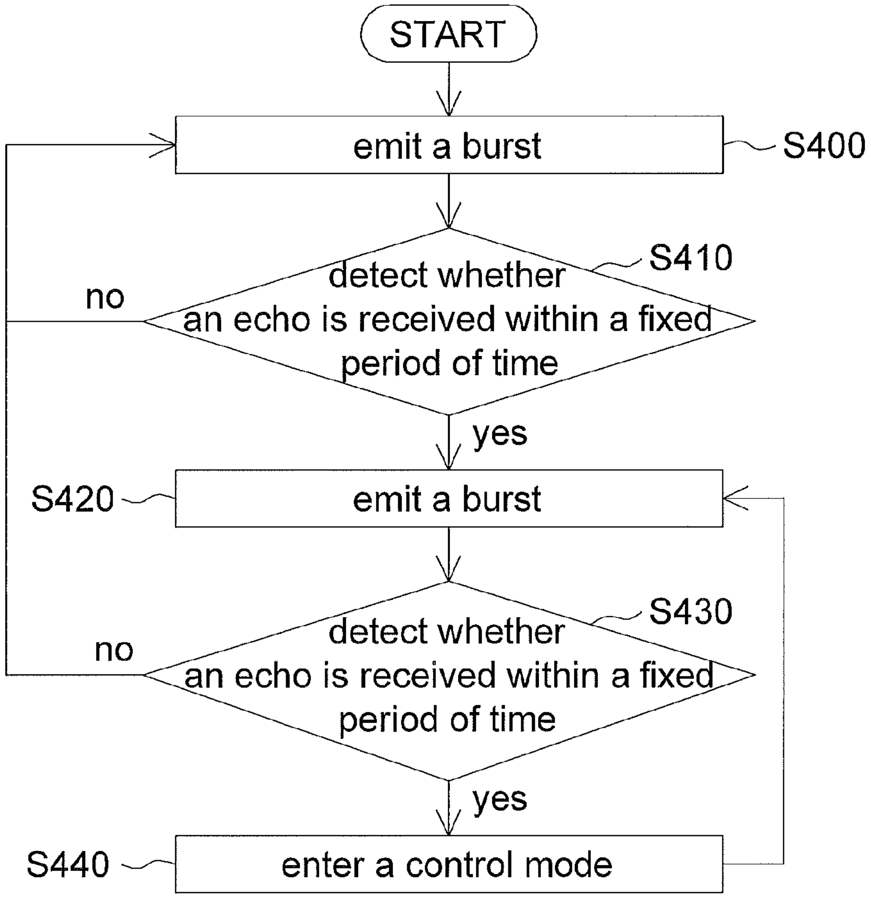
FIG. 4 shows a flowchart of an ultrasonic lamp control method according to a preferred embodiment of the invention; and FIGS. ***5a*~*5d*** show timing diagrams of different bursts and different echoes of the ultrasonic lamp control method according to a preferred embodiment of the invention.
Figure 5A:
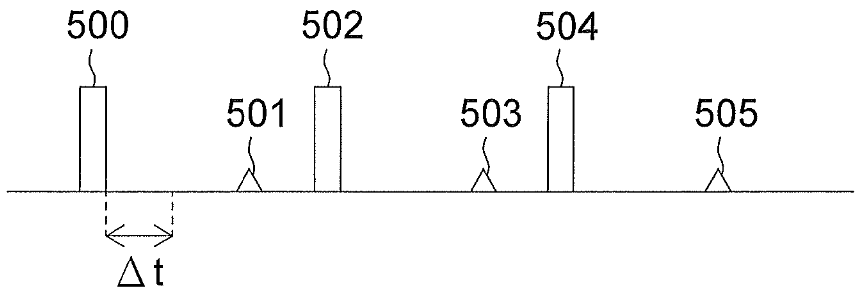

Referring to FIG. 4 and FIGS. 5*a*~5*d*. FIG. 4 shows a flowchart of an ultrasonic lamp control method according to a preferred embodiment of the invention. FIGS. 5*a*~5*d* show timing diagrams of different bursts and different echoes of an ultrasonic lamp control method according to a preferred embodiment of the invention. FIG. 5*a* shows the bursts 500, 502, 504 regularly emitted by a single ultrasonic lamp and the reflected echoes 501, 503, 505 of said bursts. Since the echo is not received within the fixed period of time Δt, that is, the object is not located inside the control region, then the lamp will not enter a control mode.

Figure 5B:
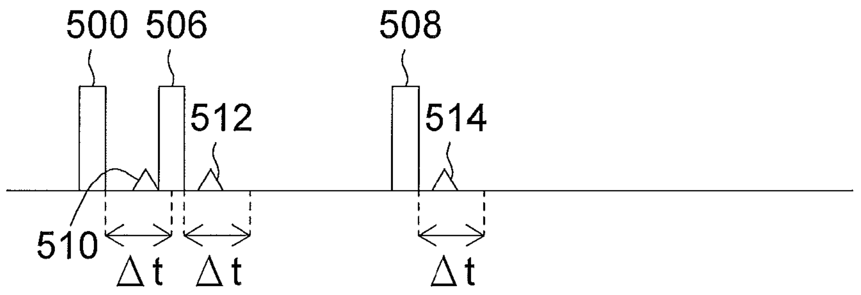
Figure 5C:
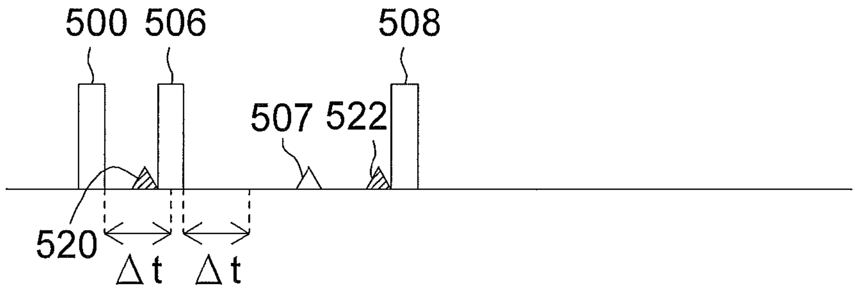

Referring to FIG. 4, and FIGS. 5*b* and 5*c*. Firstly, the control method begins at step S400, the microprocessor 202 drives the ultrasonic transmitter 204 to emit a burst 500. Next, the method proceeds to step S410, the microprocessor 202 detects whether an echo is received by the ultrasonic receiver 206 within a fixed period of time Δt immediately after the emission of the burst 500, and if the ultrasonic receiver 206 does not receive the echo, then the method returns to step S400, the microprocessor 202 drives the ultrasonic transmitter 204 to continuously emit a burst 502 at a predetermined time interval. If the echo is received by the ultrasonic receiver 206 in step S410, then the method proceeds to step S420, the microprocessor 202 neglects the current echo and drives the ultrasonic transmitter 204 to emit a burst 506. Then, the method proceeds to step S430, the microprocessor 202 detects whether an echo is received by the ultrasonic receiver 206 within the fixed period of time Δt immediately after the emission of the burst 506. If the echo is received by the ultrasonic receiver 206 within the fixed period of time Δt in step S430, then the method proceeds to step S440, the ultrasonic lamp enters the control mode. If no echo is received in step 430, then the method returns to step S400, the ultrasonic transmitter 204 continues to emit a burst.

The echo received by the ultrasonic receiver 206 in step S410 may be a correct echo (the reflective object is located inside the control region) as indicated in FIG. 5*b*, or an incorrect echo of other ultrasonic lamp as indicated in FIG. 5*c*. The two scenarios are respectively disclosed below.

In FIG. 5*b*, if the echo received in step S410 is a correct echo 510 (the reflective object is located inside the control region), then after a burst 506 is emitted in step S420, an echo 512 will be received by the ultrasonic receiver 206 within the fixed period of time Δt in step S430. Thus, the microprocessor 202 determines that the reflective object is indeed located inside the control region, and the method proceeds to step S440, the microprocessor 202 enables the ultrasonic lamp 200 to enter a control mode. After entering the control mode, the method then returns to step S420, the microprocessor 202 continues to drive the ultrasonic transmitter 204 to emit a burst 508. Then, the method proceeds to step S430, whether an echo 514 is received by the ultrasonic receiver 206 within the fixed period of time Δt is detected. In step S430, if the microprocessor 202 determines that the ultrasonic receiver 206 does not receive the echo 514, (that is, the object is no more inside the control region), then the method returns to step S400, the whole process is re-started. If the echo 514 is received by the ultrasonic receiver 206, then the properties of the light are controlled according to the time interval at which the echo is received.

Figure 1:
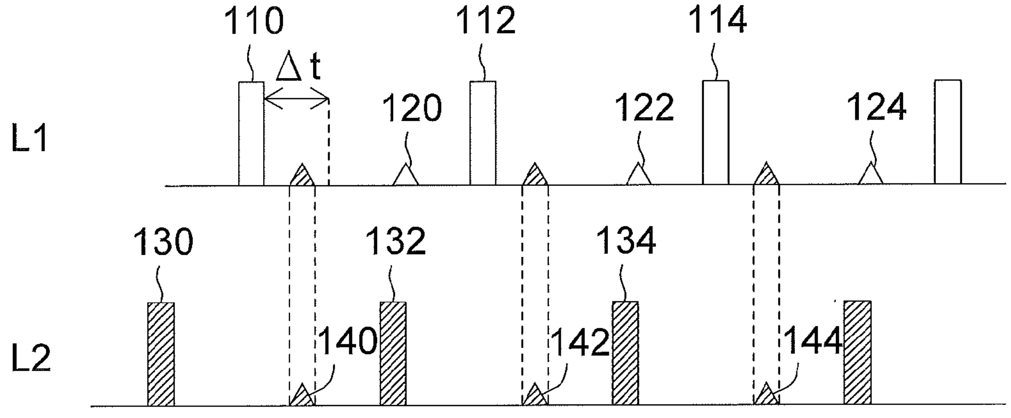
FIG. 1 shows a timing diagram of the echo interference of two ultrasonic lamps L1 and L2.

In FIG. 5*c*, if the echo received in step S410 is an incorrect echo 520 (such as an echo of a burst emitted by another lamp), then in step S430, the ultrasonic receiver 206 will not receive an incorrect echo within the fixed period of time Δt immediately after the emission of the burst 506, so the method returns to step S400, the microprocessor 202 drives the ultrasonic transmitter 204 to emit a burst 508. As indicated in FIG. 1, the echo of the burst emitted by another lamp is received at a fixed time interval. Therefore, the burst 506 is emitted immediately after the incorrect echo 520 is received, and the first echo received by the lamp 200 is the echo 507 of the burst 506, and the incorrect echo (such as the echo 522 of the second burst emitted by the another lamp) will not appear within the fixed period of time Δt immediately after the emission of the burst, and the ultrasonic lamp 200 will not erroneously enter the control mode due to the incorrect echo.

Figure 5D:
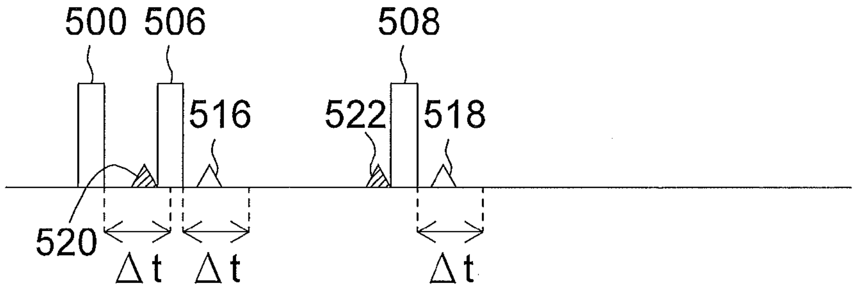

Besides, in FIG. 5*d*, suppose the echo of step S410 is an incorrect echo 520, that is, the echo of the same frequency generated by another lamp. After a burst 506 is emitted in step 420, the method proceeds to step S430, and it is determined that the ultrasonic receiver 206 receives an echo 516 within the fixed period of time Δt immediately after the emission of the burst 506. The frequency of the incorrect echo is the same as that of the burst 506, so the echo 516 is by no means an incorrect echo and will be regarded as a correct echo by the microprocessor 202, so the method proceeds to step S440, the microprocessor 202 enables the ultrasonic lamp 200 to enter a control mode. That is, after the burst 506 is emitted, the object enters the control region and generates an echo 516. Next, the method returns to step S420, the microprocessor 202 continues to drive the ultrasonic transmitter 204 to emit a burst 508. Then, the method proceeds to step S430, the microprocessor 202 detects whether an echo 518 is received by the ultrasonic receiver 206 within the fixed period of time Δt immediately after the emission of the burst 508. The incorrect echo 522 received (the echo of the burst emitted by another lamp) between the emission of the burst 506 and that of the burst 508 will not cause the microprocessor 202 to make an erroneous determination because the lamp 200 already makes a determination according to the first detected echo 516.

Moreover, the method of invention is not limited to the application only after the first burst is emitted. For example, in FIG. 5*c*, if the echo 507 is received by the ultrasonic receiver 206 within the fixed period of time Δt, then the ultrasonic lamp 200 emits a burst 508 and detects whether an echo is received within the fixed period of time Δt immediately after the emission of the burst 508. If an echo is received, then the ultrasonic lamp will neglect the echo and emit another burst.

The ultrasonic lamp and the control method thereof disclosed in the above embodiments of the invention have many advantages exemplified below:

According to the ultrasonic lamp and the control method thereof disclosed in the invention, by detecting whether an echo is received within a fixed period of time after a burst is emitted and then neglecting the first received echo if it is received within a fixed period of time and immediately emitting a burst, incorrect echoes are staggered due to the time difference of the same frequency, correct echoes are received, and errors are avoided.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ultrasonic lamp control method, comprising:

emitting a first burst by an ultrasonic lamp and detecting whether a first echo is received within a fixed period of time after the emission of the first burst;

neglecting the first echo and emitting a second burst by the ultrasonic lamp if the first echo is received within the fixed period of time;

detecting whether a second echo is received within the fixed period of time after the emission of the second burst by the ultrasonic lamp; and enabling the ultrasonic lamp to enter a control mode if the second echo is received within the fixed period of time.

2. The ultrasonic lamp control method according to claim 1, further comprising:

emitting a third burst by the ultrasonic lamp and detecting whether a third echo is received within the fixed period of time after the emission of the third burst if the first echo is not received within the fixed period of time; and neglecting the third echo and emitting a fourth burst by the ultrasonic lamp if the third echo is received within the fixed period of time.

3. The ultrasonic lamp control method according to claim 1, further comprising:

emitting a third burst by the ultrasonic lamp and detecting whether a third echo is received within the fixed period of time after the emission of the third burst if the second echo is not received within the fixed period of time; and neglecting the third echo and emitting a fourth burst by the ultrasonic lamp if the third echo is received within the fixed period of time.

4. The ultrasonic lamp control method according to claim 1, further comprising:

emitting a fifth burst and detecting whether a fifth echo is received within the fixed period of time after the emission of the fifth burst by the ultrasonic lamp when the ultrasonic lamp receives the second echo within the fixed period of time and enters the control mode; and changing the properties of the light by the ultrasonic lamp according to the time length of receiving the fifth echo if the fifth echo is received within the fixed period of time.

5. An ultrasonic lamp, comprising:

a microprocessor;

an ultrasonic transmitter coupled to the microprocessor; and an ultrasonic receiver coupled to the microprocessor;

wherein the microprocessor drives the ultrasonic transmitter to emit a first burst and detects whether a first echo is received by the ultrasonic receiver within a fixed period of time after the emission of the first burst, if the first echo is received by the ultrasonic receiver within the fixed period of time, then the microprocessor neglects the first echo and drives the ultrasonic transmitter to emit a second burst and detects whether a second echo is received by the ultrasonic receiver within the fixed period of time after the emission of the second burst, and if the second echo is received by the ultrasonic receiver within the fixed period of time, then the microprocessor enables the ultrasonic lamp to enter a control mode.

6. The ultrasonic lamp according to claim 5, wherein if the ultrasonic receiver does not receive the first echo within the fixed period of time, then the microprocessor drives the ultrasonic transmitter to emit a third burst and detects whether a third echo is received by the ultrasonic receiver within the fixed period of time after the emission of the third burst, and if the ultrasonic receiver receives the third echo within the fixed period of time, then the microprocessor neglects the third echo and drives the ultrasonic transmitter to emit a fourth burst.

7. The ultrasonic lamp according to claim 5, wherein if the ultrasonic receiver does not receive the second echo within the fixed period of time, then the microprocessor drives the ultrasonic transmitter to emit a third burst and detects whether a third echo is received by the ultrasonic receiver within the fixed period of time after the emission of the third burst, and if the ultrasonic receiver receives the third echo within the fixed period of time, then the microprocessor neglects the third echo and drives the ultrasonic transmitter to emit a fourth burst.

8. The ultrasonic lamp according to claim 5, wherein when the ultrasonic lamp enters the control mode, the microprocessor drives the ultrasonic transmitter to emit a fifth burst and detects whether a fifth echo is received by the ultrasonic receiver within the fixed period of time after the emission of the fifth burst, and if the fifth echo is received by the ultrasonic receiver within the fixed period of time, then the microprocessor changes the properties of the light according to the time length of receiving the fifth echo.

* * * * *